United States Patent
Roy

Patent Number: 5,968,401
Date of Patent: *Oct. 19, 1999

[54] MICROWAVE RADIATION INSECT EXTERMINATOR

[76] Inventor: Stephen Roy, 24672A Brighton Dr., Valencia, Calif. 91355

[*] Notice: This patent is subject to a terminal disclaimer.

[21] Appl. No.: 08/825,143

[22] Filed: Mar. 19, 1997

Related U.S. Application Data

[63] Continuation of application No. 08/559,618, Nov. 20, 1995, abandoned, which is a continuation-in-part of application No. 08/188,356, Jan. 26, 1994, Pat. No. 5,468,938, which is a continuation of application No. 07/408,273, Sep. 18, 1989, abandoned.

[51] Int. Cl.$^6$ .............................. H05B 6/80; H05B 6/72
[52] U.S. Cl. ..................... 219/690; 219/679; 219/695; 219/710; 43/112
[58] Field of Search ..................... 219/690, 695, 219/679, 696, 710, 746, 748, 757, 714; 43/112, 132.1, 124

[56] References Cited

U.S. PATENT DOCUMENTS

| | | |
|---|---|---|
| 452,513 | 5/1891 | Batter . |
| 625,711 | 5/1899 | Stevens . |
| 827,864 | 8/1906 | Hamill . |
| 884,431 | 4/1908 | Tracy . |
| 1,018,345 | 2/1912 | Roberts et al. . |
| 1,021,184 | 3/1912 | Foster . |
| 1,631,645 | 6/1927 | Rekar . |
| 1,668,678 | 5/1928 | Hassinger . |
| 1,879,826 | 9/1932 | Shaffer . |
| 1,948,228 | 2/1934 | Urban . |
| 2,027,976 | 1/1936 | Headlee . |
| 2,059,835 | 11/1936 | Worthing et al. . |
| 2,064,374 | 12/1936 | Cooper . |
| 2,114,494 | 4/1938 | Hummel et al. . |
| 2,137,876 | 11/1938 | Hudson . |
| 2,138,935 | 12/1938 | Mouromtseff et al. . |
| 2,171,315 | 8/1939 | Rennerfelt . |
| 2,223,813 | 12/1940 | Brown . |
| 2,239,069 | 4/1941 | Worden et al. . |
| 2,267,001 | 12/1941 | Toulmin, Jr. . |
| 2,281,819 | 5/1942 | Atkinson . |
| 2,332,240 | 10/1943 | Lavalley . |
| 2,377,949 | 6/1945 | McMenamy . |
| 2,459,816 | 1/1949 | Handley . |
| 2,613,307 | 10/1952 | Mirand . |
| 2,897,494 | 7/1959 | Scholz ....................................... 219/748 |
| 3,249,737 | 5/1966 | Casebeer . |
| 3,443,051 | 5/1969 | Puschner ................................. 219/748 |
| 3,745,291 | 7/1973 | Peterson et al. ........................ 219/748 |
| 3,814,890 | 6/1974 | Klemp et al. ........................... 219/748 |

(List continued on next page.)

FOREIGN PATENT DOCUMENTS

| | | |
|---|---|---|
| 855331 | 11/1952 | Germany . |
| 937200 | 12/1955 | Germany . |
| 1033887 | 7/1958 | Germany . |
| 1936502 | 1/1970 | Germany . |
| 2800517A1 | 7/1978 | Germany . |
| 3405009A1 | 8/1985 | Germany . |
| 3719994A1 | 12/1988 | Germany . |
| 54-10459 | 1/1979 | Japan ..................................... 219/748 |
| 61-274642 | 12/1986 | Japan . |
| 62-35738 | 8/1987 | Japan . |
| 60625 | 12/1937 | Norway . |
| 7807157-8 | 3/1980 | Sweden . |
| 474187 | 10/1937 | United Kingdom . |

*Primary Examiner*—Philip H. Leung
*Attorney, Agent, or Firm*—Loeb & Loeb LLP

[57] ABSTRACT

A non-toxic extermination device is disclosed herein having an RF radiation generator providing microwave, high frequency waves for penetration through solid obstacles such as walls, floors, partitions or the like. The generated waves are characterized as being effective to cause insect internal molecular friction to generate deadly heat.

7 Claims, 5 Drawing Sheets

U.S. PATENT DOCUMENTS

| | | |
|---|---|---|
| 3,826,035 | 7/1974 | Paniagua . |
| 3,949,189 | 4/1976 | Bilbro et al. . |
| 3,997,759 | 12/1976 | Osrow et al. . |
| 4,131,786 | 12/1978 | Cooper ................................ 219/714 |
| 4,140,130 | 2/1979 | Storm, III . |
| 4,157,464 | 6/1979 | Smith et al. . |
| 4,236,055 | 11/1980 | Kaminaka ............................ 219/702 |
| 4,256,944 | 3/1981 | Brandon . |
| 4,265,029 | 5/1981 | Jenkins . |
| 4,282,887 | 8/1981 | Sterzer . |
| 4,366,644 | 1/1983 | Lawrence . |
| 4,370,534 | 1/1983 | Brandon ................................ 219/748 |
| 4,383,156 | 5/1983 | Furusawa .............................. 219/702 |
| 4,416,908 | 11/1983 | McKinney et al. .................... 219/679 |
| 4,434,345 | 2/1984 | Muscatell .............................. 219/748 |
| 4,517,430 | 5/1985 | Slottag .................................. 219/710 |
| 4,778,970 | 10/1988 | Klaila ................................... 219/748 |
| 4,843,752 | 7/1989 | Munemasa et al. . |
| 4,912,742 | 3/1990 | Nath . |
| 5,058,313 | 10/1991 | Tallon .................................. 43/132.1 |
| 5,442,876 | 8/1995 | Pedersen . |
| 5,468,938 | 11/1995 | Roy ...................................... 219/690 |
| 5,575,106 | 11/1996 | Martin et al. . |

MICROWAVE RADIATION INSECT EXTERMINATOR

RELATED APPLICATIONS

This application is a continuation of application Ser. No. 08/559,618, filed on Nov. 20, 1995, abandoned, which is a continuation in part of application Ser. No. 08/188,356 filed on Jan. 26, 1994, Pat. No. 5,468,938, which is a continuation of application Ser. No. 07/408,273 filed on Sep. 18, 1989, abandoned.

BACKGROUND OF THE INVENTION

1. Field of the Invention

The present invention relates to the field of insect and bug extermination, and more particularly to a novel exterminating device employing microwave energy which is generated and distributed over an area intended to be freed of insects, bugs or the like.

2. Description of the Related Art

In the past, it has been the conventional practice to effect the extermination of bugs and insects by employing a variety of aerosol or other pressurized systems for distributing a wet mist in a limited area in order to spread a chemical substance for contacting specific insects or bugs. Such devices are normally called "foggers" and employ a pressurized canister with a manually released valve for discharging a wet toxic chemical vapor into the surrounding air.

Difficulties and problems have been encountered when using such prior chemical dispensing devices which stem from the fact that the discharge is a wet mist which is heavy and has a tendency to drop upon surrounding floor areas so that only a relatively small area is serviced by the chemical. Also, wet mists generally leave a residue on furniture, sinks, wall surfaces or any utensils or other items upon which the wet mist comes into contact.

Another problem resides in the fact that the chemicals used are highly toxic in such systems and great care must be taken to remove any food, utensils or other articles upon which the wet mist may come into contact so that the chemical is not inadvertently ingested by humans or animals.

Still a further problem with such toxic chemicals resides in the fact that pests, such as termites, woodboring beetles, etc. extend into inaccessible areas of a wall or floor structure as well as in spaces between the floors and certain ceiling areas. Current methods involve either employment of the wet mist or gas fumigation systems of the entire structure or physically opening the infested area so that it can be treated with a toxic chemical. Both of these methods require considerable inconvenience to the occupant as well as the release of toxic chemicals into the surrounding environment.

Therefore, a long standing need has existed to provide a novel extermination system for such pests which is dry and that is non-toxic to humans or animals. Such a system vastly increases the total area over which the effects of extermination are distributed so that its effectiveness is increased for exterminating bugs, insects and particularly wood-boring pests. Also, such a novel extermination system may be used again and again so that it is not necessary to dispose of pressurized cans or containers.

SUMMARY OF THE INVENTION

Accordingly, the above problems and difficulties are obviated by the present invention which provides a novel pest exterminating means employing microwave energy in the form of high frequency radio waves in the range of less than 3 meters in length so that the energy will penetrate through walls, floors or other structures in which the pests or insects are found. The apparatus of the present invention includes a magnetron assembly having a variable horn adapted to radiate radio frequency energy in the range of 2.46 gigahertz as an example. The magnetron assembly is powered by a rectified high voltage supply energized from an AC power transformer under the control of a timer and relay assembly. The device further includes suitable safety interlock closures for protecting personnel while the device is open for maintenance or inspection. Indicating means and display means are provided showing operating status of the apparatus, and a fan is employed for cooling the magnetron assembly. The unit is powered from a conventional line voltage using standard plug and socket connectors.

In one form of the invention, the magnetron assembly and radiating horn-shaped waveguide emits microwave energy causing living organisms to a heat buildup through internal molecular friction which kills the pests without disturbing the wall or other materials. In the present invention, the microwaves are directed to a target area located external to the housing in which insects may be found. Insects may be found in inaccessible areas of a structure such as walls, spaces between floors, or ceilings and the like which would be impossible to place in an enclosure for extermination by exposure to microwave radiation. For example, termites are often found in timber used in construction of the supporting frame of homes and other structures. The termite infested timber is usually located beneath construction materials such as dry wall or plaster and is typically unaccessible. Further, it would be impossible to place such structures into an enclosure for exposure to microwave energy to exterminate any unwanted insects contained in such a structure.

The magnetron of the claimed invention is a low power magnetron that is hand lifted, does not require a vehicle for transportation, and can be positioned within a structure. The magnetron of the claimed invention is of relatively low power and may be powered by a 24 volt battery. The magnetron of the claimed invention is air cooled such that the overall weight of the magnetron is minimized to facilitate the portability of the device by hand.

OBJECTS OF THE INVENTION

Therefore, it is among the primary objects of the present invention to provide a novel insect, pest and bug exterminating means which includes the generation of microwave energy that is detrimental to pests but is not detrimental to structures, such as walls, floors or the like.

Another object of the present invention is to provide an exterminating device which generates microwave energy in order to eliminate pests, such as termites, wood-boring beetles or the like, that extend into inaccessible areas of a structure.

Yet another object of the present invention is to provide a novel device and method for eliminating pests so that the occupants of an area are not disturbed and so that the removal of plants, pets or foods from the structure is not required.

Another object of the present invention is to provide a novel fumigation and pest extermination system and method that eliminates the necessity for toxic chemicals or fumigants with their possible adverse side effects.

These and other objects of the present invention will become apparent from a review of the accompanying drawings and the detailed description of the drawings.

DETAILED DESCRIPTION OF THE DRAWINGS

Figure 1:
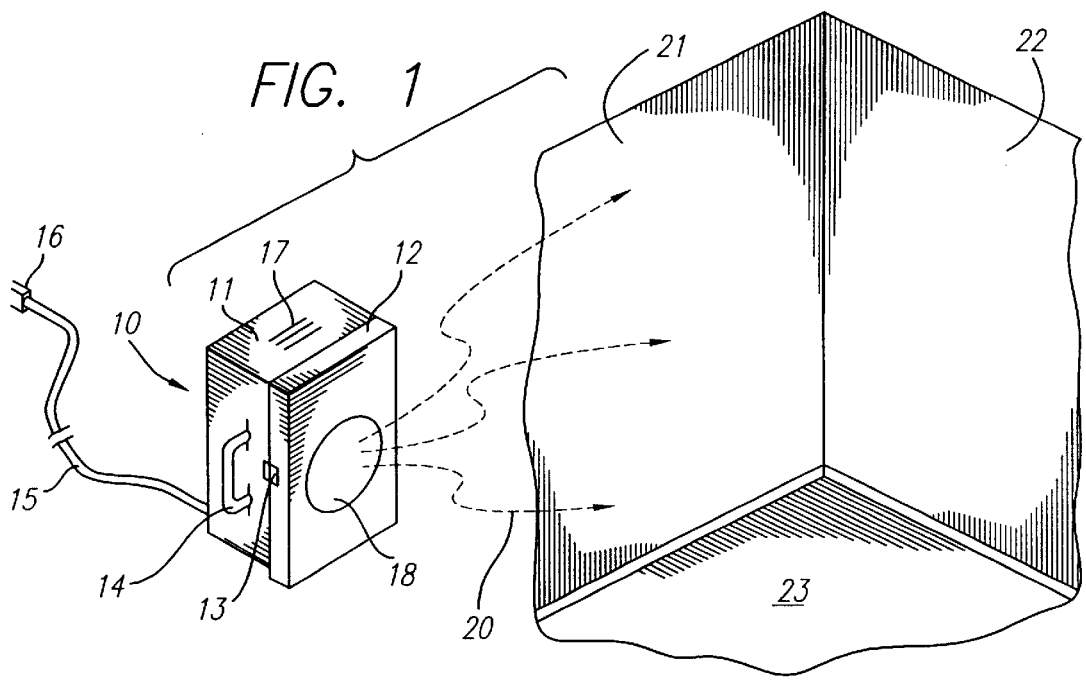
FIG. 1 is a perspective view showing the microwave radiation insect exterminator of the present invention employed in a typical pest elimination situation.

Referring to FIG. 1, the microwave exterminating apparatus of the present invention is generally referred to by the numeral 10. The microwave exterminating apparatus 10 includes a housing 11 having a pivoting cover 12 which is releasably fastened to the housing 11 by means of snap fasteners, such as latch 13. A handle 14 is provided for transporting the microwave exterminating apparatus 10 from place to place as the apparatus 10 is not disposable and may be repeatedly used. The microwave exterminating apparatus 10 is preferably operated via line voltage provided by a cord 15 having a plug 16 on its free end and adapted to be attached to a socket (not shown) operably coupled to a line voltage source. The microwave exterminating apparatus 10 includes a plurality of controls having manual actuators projecting exteriorly of the housing 11 and which includes a discharge vent 17 in the top of the housing 11 for passing heated air into a surrounding area in order to cool the interior of the housing 11. The discharge vent 17 may include a grill to prevent debris from entering into the interior of the housing 11.

The microwave exterminating apparatus 10 is employed for generating microwave energy which is radiated outwardly from a discharge horn-shaped waveguide 18 with the radiating microwave energy is indicated by the arrows 20. The microwave energy 20 is directed towards walls 21 and 22 of a building or structure intended to have pests eliminated therefrom. Also, the microwave energy 20 may be directed towards the floor 23 for achieving the same purpose.

Figure 2:
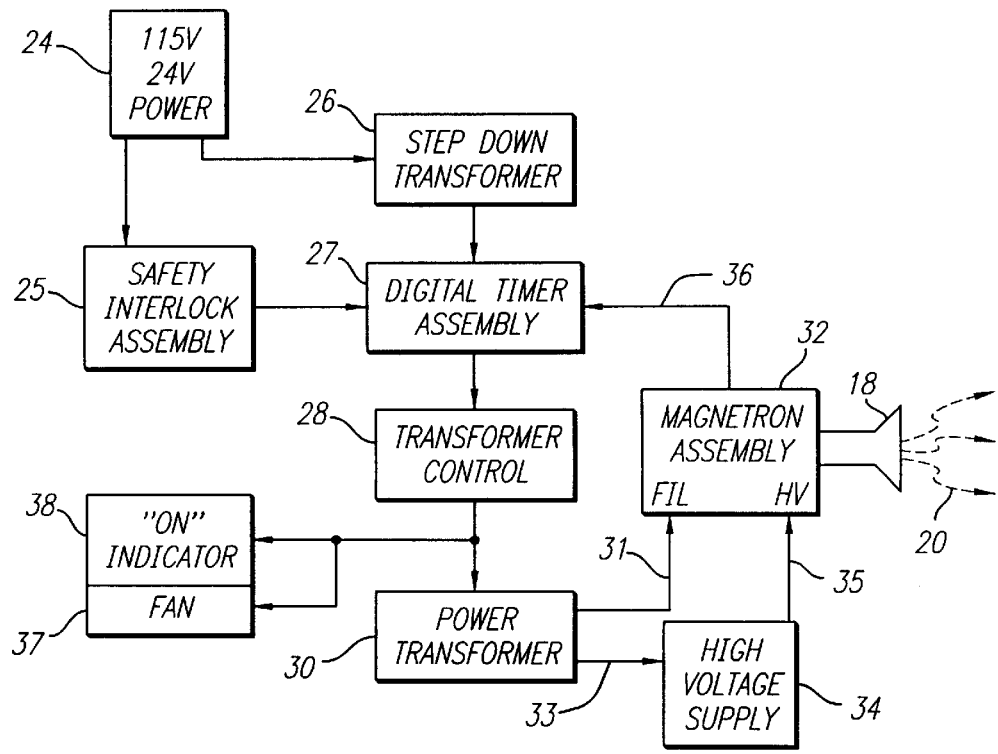
FIG. 2 is a block diagram illustrating the various components employed in the microwave radiation insect exterminator of the present invention used in the environmental setting shown in FIG. 1.

Referring specifically to FIG. 2, a block diagram of the microwave exterminating apparatus 10 is illustrated which is contained within the housing 11 and which is employed for generating microwave energy 20. The microwave exterminating apparatus 10 comprises a power source 24 which may be a battery of approximately 24 volts or, if desired, line voltage of 115 to 220 volts may be used. The power is directed through a safety interlock assembly 25 whereby the opening of the cover 12 for service or maintenance purposes will disengage the power from the microwave exterminating apparatus 10. The safety interlock assembly 25 comprises a plurality of switches arranged in an electrical series relationship. A stepdown transformer 26 is coupled in parallel with the safety interlock assembly 25 to a digital timing assembly 27 that is actuated by a start button. Starting of the timing assembly 27 supplies power to the transformer control 28 taking the form of a relay to activate an AC power transformer 30. The AC power transformer 30 is coupled to a low voltage line 31 which may be a 3 volt AC voltage line going to the filament of a magnetron assembly 32. A high voltage AC line 33 couples the output from the power transformer 30 to a high voltage supply 34. The high voltage supply 34 includes a voltage doubler and rectifier so that output line 35 is connected to the high voltage circuit of the magnetron assembly 32 and carries a current in the range of 2,000 to 4,000 volts of direct current.

The magnetron assembly 32 includes an overheating sensor which is coupled back to the digital timing assembly 27 via lead line 36. In the event that an overheating condition is sensed in the magnetron assembly 32, the microwave exterminating apparatus 10 can be shut off through the timing assembly 27. Also, in an effort to prevent overheating, a fan 37 is powered from the transformer control 28, as well as an "ON" indicator 38 so that the operator will know of the operating condition of the microwave exterminating apparatus 10.

The microwave exterminating apparatus 10 is effective at eliminating pests and other vermin using high frequency microwaves with a wavelength that is less than 3 meters in length in order to penetrate through walls 21, 22 or floor 23 or other solid or semi-solid barriers. The exposure to microwave energy causes different materials to either absorb, pass or reflect the microwave energy. Living organisms, such as pests or insects, are composed primarily of proteins, fats or water, which absorb microwave energy and causes a heat buildup in the organisms through internal molecular friction. The heat generated from the internal molecular friction kills the pests or vermin without disturbing the walls 21, 22 of a structure or other materials in which the pests are found, because the structure or materials in which the pests are located will heat at a much slower rate than the pests themselves.

The output of the magnetron assembly 32 via the variable size changing horn-shaped wave guide 18 is an RF radiation in the range of 2.46 gigahertz. The particular wavelength of 2.46 gigahertz is ideal for transferring energy to polar molecules. The most common polar molecule is the water molecule. Materials that are metallic reflect microwave radiation. Materials that are non-metallic and non-polar are transparent to microwave radiation. Since the microwave signal selectively transfers its energy to polar molecules, any material containing polar molecules, will be selectively heated when exposed to microwave radiation, especially at the frequency of 2.46 gigahertz.

Generally speaking, insects have a much higher water content than their environment. This is especially true if the environment in which the insects are located is for example framing lumber which is typically 7% to 30% water by weight. Insects generally range from 50% to 95% water by weight. As a result, the insects contain a greater density of polar molecules than the wood in which they are found and when exposed to microwaves, the insects will increase in temperature at a faster rate than the wood environment. It has been shown that drywood termites must be at 160° F. for a minimum of five minutes to get a 100% effective extermination rate. In the preferred embodiment, the microwave extermination apparatus 10 of the present invention is designed to heat the environment in which the termites are located to a temperature of up to 200° F. and maintain a temperature above 160° F. for at least five minutes after exposure to the microwave radiation. In this manner, the termites are heated above the boiling point of water such that the termites explode from the inside out due to the formation of steam bubbles within the termites. Eggs or termites in any stage of development suffer the same destruction.

The horn-shaped wave guide 18 directs the microwave energy 20 being emitted from the magnetron assembly 32 to provide unidirectional coverage of the target area in which pest elimination is desired. In this manner, a relatively large area may be exposed to microwaves having a moderate intensity and even directivity.

Further, the horn-shaped wave guide 18 is capable of increasing the signal gain of the microwaves being emitted from the magnetron assembly 32 and through the horn-shaped waveguide 18. The signal gain created by the horn-shaped waveguide 18 is based on the formula: Gain=$10 A/L^2$, where A is the area at the exit of the horn-shaped waveguide 18, and L is the wavelength. The signal gain is derived from the fact that energy is concentrated into a limited space within the waveguide 18, instead of being distributed over a larger surface, such as a spherical surface of a parabolic reflector. The horn-shaped wave guide 18 is capable of directing the microwaves from the magnetron assembly 32 in a single direction to provide unidirectional and uniform coverage of a relatively large area with moderate intensity. The amplification and directing of the generated microwaves allows sufficient energy transfer to the specific target area to effectively kill the insects.

In view of the foregoing, it can be seen that the method and apparatus of the present invention eliminates such pests as termites, wood-boring beetles or the like that extend into inaccessible areas of a structure such as wall areas, spaces between floors, ceiling areas or the like. The apparatus and method of the present invention do not incorporate wet mists or toxic chemical substances and occupants do not have to move out of the area being subjected to pest elimination. Also occupants need not remove plants, pets or foods from the structure being treated since non-toxic materials are used. The introduction of fumigants with their possible adverse side effects is greatly reduced and the release of toxic fumigants into the atmosphere for aeration purposes is completely avoided. Furthermore, by using the method and microwave generating apparatus of the present invention, building structures, such as roof tiles and surrounding landscaping are not broken or damaged due to the conventional practice of employing heavy tarps to cover a structure intended to be fumigated.

Figure 3:
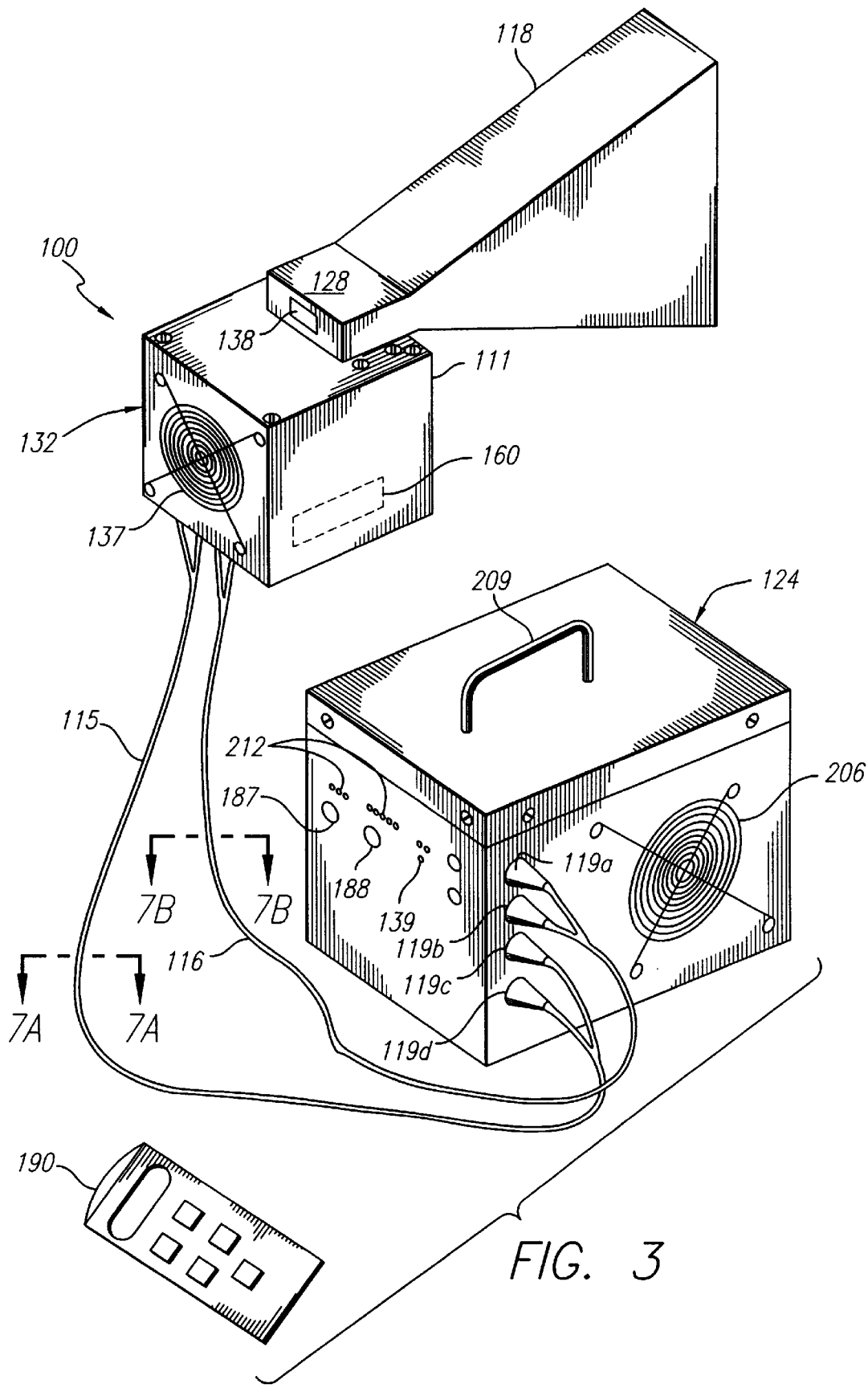
FIG. 3 is side perspective view of an alternative embodiment of the microwave radiation insect exterminator of the present invention.

Referring to FIG. 3, an alternative embodiment of the microwave exterminating apparatus of the present invention generally referred to by the numeral 100 is shown. The microwave exterminating apparatus 100 comprises a magnetron assembly 132, a power supply 124, and an infrared remote control 150.

The magnetron assembly 132 is similar to the magnetron assembly 32 described above and comprises a magnetron 140, a cooling fan 137, flashing lighted electron diode (LED) 138, and a thermal cut-off switch 160 that are mounted in a protective housing 111. The magnetron 140 is coupled to a horn-shaped waveguide 118 having a rectangular transition segment 128. The waveguide 118 is a radiation focusing sectoral antenna and is attached to the protective housing 111. In the preferred embodiment, the magnetron assembly 132 weighs approximately eight pounds, and radiates approximately 870 watts of power at a frequency of 2.46 gigahertz. The microwave energy generated by the magnetron assembly 132 is focused on the intended target area by the waveguide 118.

Figure 4:
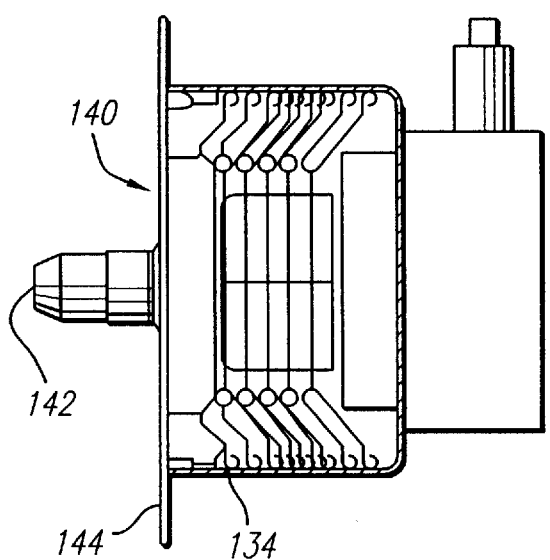
FIG. 4 is a side cross sectional view of a magnetron used in the microwave radiation insect exterminator of the present invention.

Referring to FIG. 4 a cross sectional view of the magnetron 140 is shown. In the preferred embodiment, the magnetron 140 is of the type commercially available from Richardson, Electronics, Ltd., in Woodland Hills, Calif. The magnetron 142 is configured to fit within the housing 111, has an emission port 142 for emitting microwaves and comprises a plurality of cooling vanes 134. The emission port 142 extends from the magnetron 140 and functions to conduct microwaves generated by the magnetron 140 to the exterior of the magnetron 140.

Figure 5:
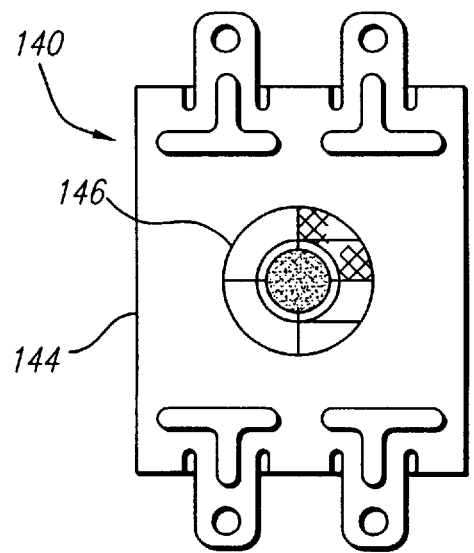
FIG. 5 is a top plan view of the magnetron shown in FIG. 4.

Referring to FIG. 5, a top plan view of the magnetron 140 is shown. The magnetron 140 has an attachment plate 144 for attachment the magnetron 140 to the housing 111 and for attachment to the waveguide 118. The attachment plate 144 comprises a central aperture 146 though which the emission port 142 extends. The attachment plate 144 comprises a plurality of holes 148a–d and slots 150a–d for receiving hardware, such as bolts for attachment to the housing 111 and waveguide 118.

Figure 6A:
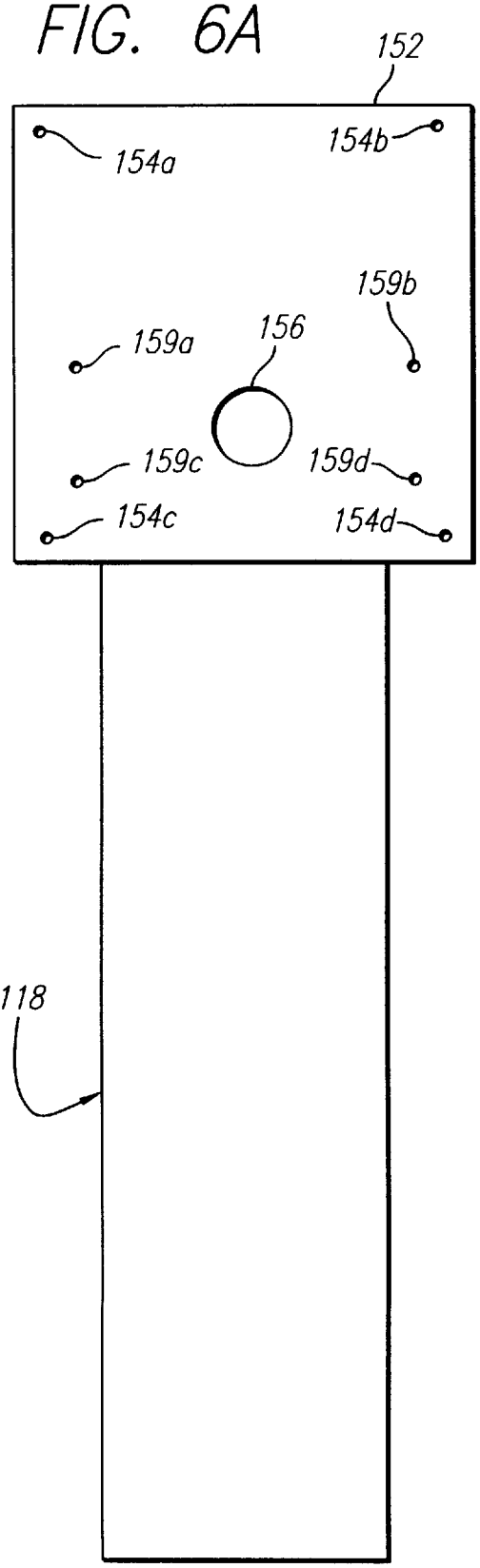
FIG. 6A is a bottom plan view of the horn-shaped waveguide of the microwave radiation insect exterminator shown in FIG. 3.

Referring to FIG. 6A, a bottom plan view of the waveguide 118 is shown. The waveguide 118 has a base portion 152 at the bottom of the rectangular transition segment 128 for attachment to the housing 111. The base portion 152 may be attached to the housing 111 by bolts through holes 154a–d. The base portion 152 has a receiving aperture 156 for receiving the emission port 142 and a plurality of holes 159a–d for attaching the base portion 152 to the magnetron 140. In the assembled state, the emission port 142 is coupled to a receiving aperture 156 in the waveguide 118 and the microwaves generated by the magnetron 140 are conducted through the waveguide 118 to the site being treated with the microwaves.

Figure 6B:
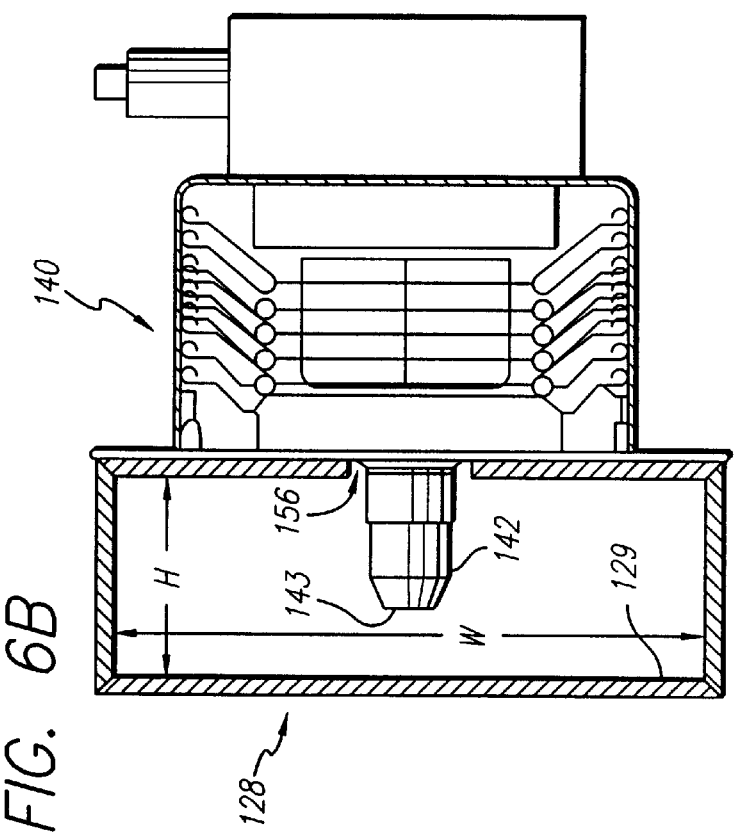
FIG. 6B, a side cross sectional view of a magnetron coupled to the transition segment of the horn-shaped waveguide of the present invention.

Referring to FIG. 6B, a sectional view of the magnetron 140 coupled to the transition segment 123 of the horn-shaped waveguide 118 is shown. In the preferred embodiment of the microwave exterminating apparatus 100, the wavelength of the microwaves being emitted by the magnetron 140, is approximately 4.8 inches. If the height H of the transition segment 128 is close to or greater than this dimension, the microwave signal emitted from the emission port 142 will be reflected off the back wall 129 of the transition segment 128 that is diametrically opposite to the emission port 142 of the magnetron 140. As a result, the microwave signal will be reflected back to the emission port 142 such that the emission port 142 will effectively heat itself to destruction. To avoid such an outcome, the distance between the exit of the emission port 142 to the wall 129 should be limited to less than half the generated wavelength, which in the preferred embodiment is approximately 2.4 inches. It is also necessary to allow a sufficient distance between the emission port 142 and the nearest wall in the transition segment 128 to avoid creating hot spots within the transition segment 128 resulting from crossing wave patterns.

In the preferred embodiment of the microwave exterminating apparatus 100, the transition segment 128 has a height H of approximately 1.5 inches. The distance from the tip 143 of the emission port 142 to the back wall 129 of the transition segment 128 is approximately 1.04 inches. At this distance no measurable heat build up of the emission port 142 is detected. Distances less than 1.04 resulted in hot spots both on the emission port 142 and in the transition segment 128.

In the preferred embodiment, the transition segment 128 has an optimal width W of approximately 3.76 inches, with the emission port 142 located in the center of the transition segment 128. It is appreciated that the transition segment 128 may have a number of other widths without departing from the scope of the present invention.

Referring again to FIG. 3, the cooling fan 137 keeps the magnetron assembly 132 within a safe operating temperature range by circulating ambient air through the housing 111, thus removing any excess heat. The cooling fan 137 is located on the back of the magnetron assembly 132 so that the magnetron 140 may be placed on any of its sides during operation to reach areas which cannot be accessed with the magnetron assembly 132 in the upright position, such as the baseboard of a wall or the space between floors for example.

The thermal cut-off switch 160 is attached to the cooling vanes 134 of the magnetron 140 and responds to the temperature of the magnetron assembly 132. In the event that the magnetron assembly 132 exceeds a specified temperature, for example approximately 190° C., the thermal cut-off switch 160 will cut-off the power to the magnetron 140. The magnetron 140 cannot operate again until the thermal cut-off switch 160 is once again within its pre-set temperature range. The thermal cut-off switch 160 functions as a safety consideration for the operator, the equipment, and the working environment.

The flashing LED 138 on the magnetron assembly 132 operates whenever the magnetron 140 is powered to warn the operator that the magnetron 140 is radiating power. If the magnetron 140 does not radiate power for any reason, the LED 138 will not flash. There is also a power indicating LED 139 mounted on the power supply 124. If the flashing LED 138 on the magnetron assembly 132 fails, the power LED 139 on the power supply 124 flashes to indicate that the magnetron 140 is radiating power. Such a system helps avoid the possibility of sending an unintentional radiation signal.

The power supply 124 is coupled to the magnetron assembly 132 by two cables 115 and 116. Cable 115 supplies power to the magnetron 140 by two parallel positive lead lines 117a and 117b, which in the preferred embodiment are size 12 American Wire Gauge (AWG) rated at 15,000 volts direct current (VDC). The electrical connectors 119a–d are of a sealed positive lock type that are also rated at 15,000 VDC. In the preferred embodiment, the maximum voltage of the microwave exterminating apparatus 100 is 3,200 VDC. Typically, the lines 117a and 117b also carry less than 2,100 volts alternating current (VAC).

Figure 7A:
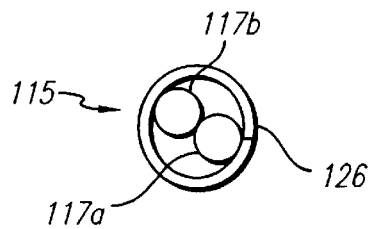
FIG. 7A is a cross sectional view along lines 7A—7A of the cable shown in FIG. 3.
Figure 7B:
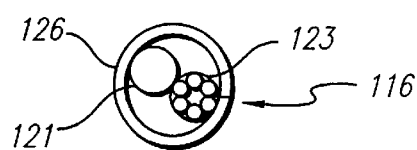
FIG. 7B is a cross sectional view along lines 7B—7B of the cable shown in FIG. 3.

Referring to FIGS. 7A and 7B, cable 116 is coupled to the magnetron assembly 132 and has a ground wire 121 size 12 AWG, rated at 15,000 VDC and a control line 123 for providing electrical control of the magnetron 140. The control line 123 comprises a six pole cable that is double insulated. The individual lines of the control line 123 are size 24 AWG, rated at 300 VAC and 3 AMPS. The connections for the ground wire 121 and control cable 123 are sealed, positive lock type. The bundle of individual lines of the control line 123 is sheathed in an extra layer of insulation. Additionally, the connector is a six pole configuration that will not allow connection to the other plugs eliminating the possibility of connecting the wrong wires. The ground wire 121 plugs into both the magnetron 140 and the power supply 124.

The positive lead lines 117a and 117b are both 12 AWG lines insulated for 15,000 VDC. Each of the two cables 115 and 116 are held together by ⅜" diameter corrugated polyethylene tubing 126 that is split down the side to keep the positive lead lines 117a and 117b separate from the control line 123 and ground wire 121 and to protect each cable from abrasion and sharp edges that might cut through the wire insulation.

Figure 8:
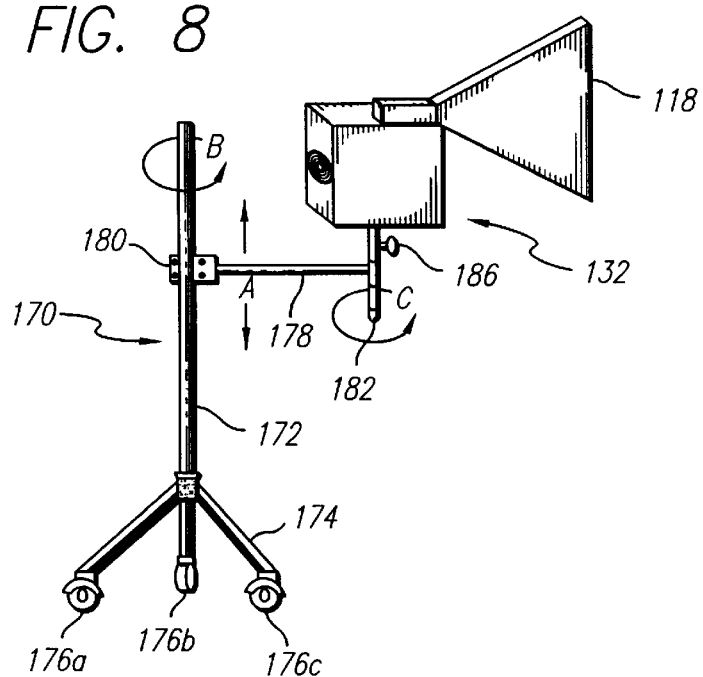
FIG. 8 is a perspective view of the magnetron head of the microwave exterminator of FIG. 3 mounted to a tripod apparatus.
Figure 9:
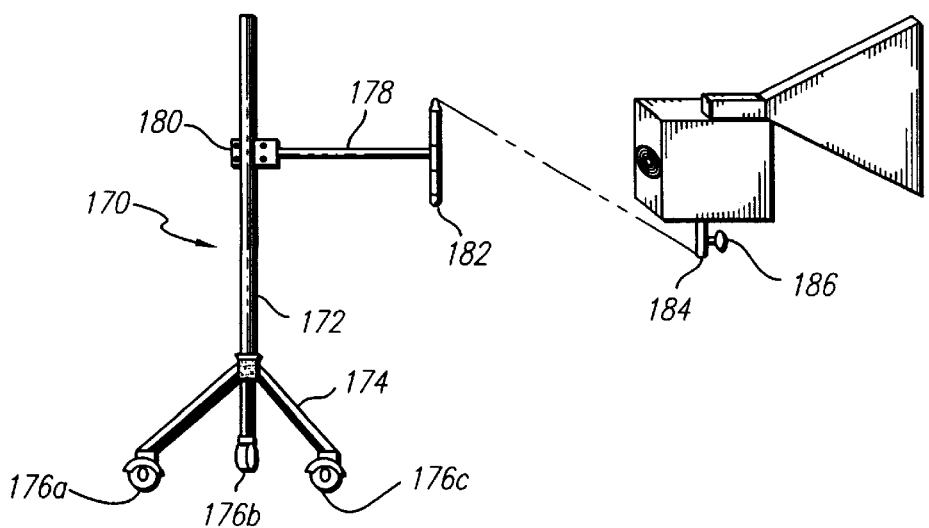
FIG. 9 is an exploded, perspective view of the microwave radiation insect exterminator the present invention shown detached from the tripod apparatus shown in FIG. 8.

Referring to FIGS. 8 and 9, the microwave exterminating apparatus 100 is shown with the magnetron assembly 132 mounted to a castered tripod 170 for mobility and positioning of the magnetron assembly 132. The castered tripod 170 has a central mast 172 that is supported by a base 174 having wheels 176a–c. The mast 172 is pivotally mounted to the base 174 that freely rotates about the central longitudinal axis of the mast 172 as illustrated by arrow B. Attached to the mast 172 is a support arm 178 for supporting the magnetron assembly 132. The support arm 178 rotates about the central longitudinal axis of the mast 172 as illustrated by arrow B. The support arm 178 is slideable up and down the mast 172 in the direction of arrow A and may be locked in a desired position with clamp 180. The support arm 178 has a support post 182 at its free end perpendicular to the support arm 178. The post 182 couples to a sleeve 184 of the magnetron assembly 132 and is secured by the clamp 186 to hold the magnetron assembly 132. The post 182 extends above and below the horizontal plane of the support arm 178 such that the magnetron assembly 132 may be coupled to the post 182 either above or below the horizontal plane of the support arm 178. As shown in FIG. 8, the magnetron assembly 132 is coupled above the horizontal plane of the support arm 178. Once the magnetron assembly 132 is coupled to the post 178, the magnetron assembly 132 may be rotated about the central axis of the post 178 in the direction of the arrow C and locked into the desired position by the clamp 180.

The moveable support arm 178 permits the placement of the magnetron assembly 132 in various positions along the mast 172 of the tripod 170 in order to position the magnetron assembly 132 for the treatment of a desired area. Once the desired position of the magnetron assembly 132 has been obtained, the clamp 180 is tightened to lock the magnetron assembly 132 in the desired position. The castered tripod 170 functions to maintain the magnetron assembly 132 fixed in a desired position during the operation of the microwave exterminating apparatus 100 during the treatment of a particular area of a structure with microwave radiation.

During the operation of the microwave exterminating apparatus 100, since the magnetron assembly 132 is being held by the tripod 170, the operator may be positioned at a safe distance away from the magnetron assembly 132 to prevent exposure to the microwave radiation. The microwave exterminating apparatus 100 may be activated by an operator manually via the switch 188 on the power supply 124. Alternatively, the microwave exterminating apparatus 100 can be turned on and off at distances of up to fifty feet by use of the infrared remote control 190. The remote control 190 is 4.5 inches long, 1.25 inches wide, 0.875 inches thick and weighs approximately three ounces. The remote control 190 operates at a frequency between 20 to 40 kilohertz through the use of a phase-lock loop. This greatly reduces the possibility of an accidental triggering of the system from any signal originating from another source. In this manner, the operator remains a safe distance from the magnetron assembly 132 reducing the chances of exposure to microwave radiation. The magnetron assembly 132 is easily moved to the next area to be treated by rolling the tripod 170 on its wheels 176a–c.

Figure 10:
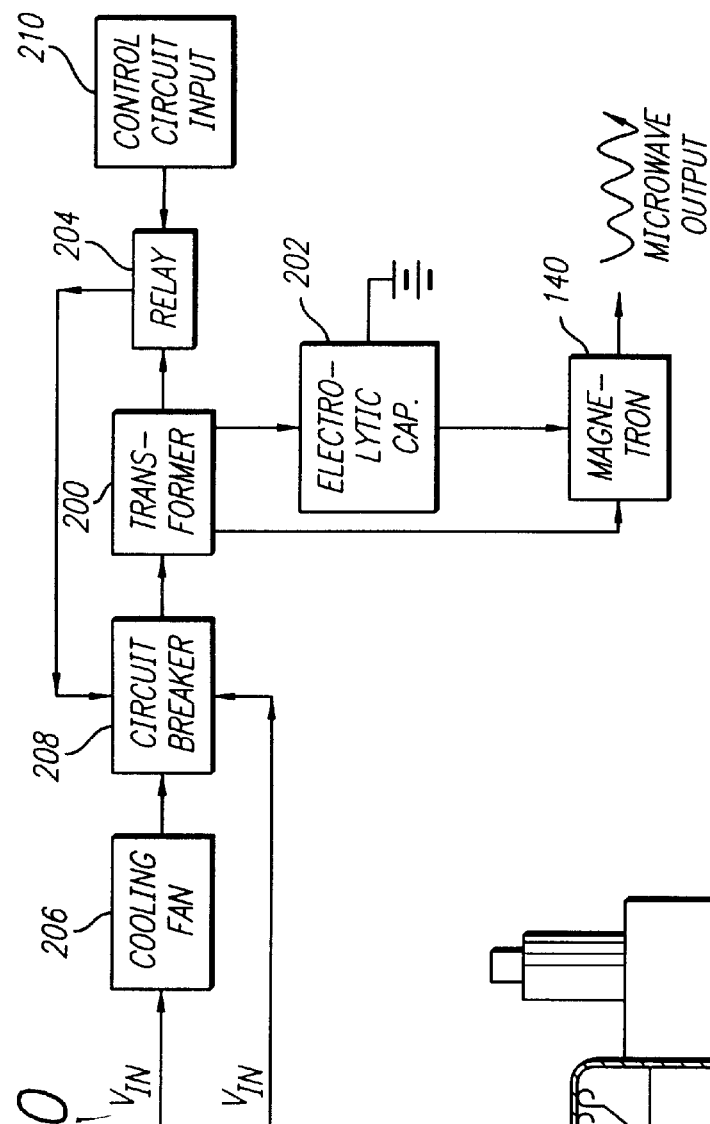
FIG. 10 is a block diagram illustrating the various components of the power supply of the microwave radiation insect exterminator of FIG. 3.

Referring to FIG. 10, the power supply 124 comprises a power transformer 200, power capacitor 202, power relay 204, cooling fan 206, and circuit breaker 208. The power supply 124 weighs approximately twelve pounds and is hand portable by the handle 209. The power transformer 200 converts common household power (120 VAC) to 3,000 VDC and 2,000 VAC. A 15 amp circuit breaker 208 installed on the incoming 120 VAC line protects the power transformer 200 from over-current conditions. The power capacitor 202, which is preferably made of an aluminum electrolytic device, regulates the power signal. The power relay 204 serves to connect the control circuit 210 low power to the high power switches that regulate the operating power transformer 200 and, therefore, the magnetron 140. The cooling fan 206 circulates the ambient air to keep the power transformer 200 within its specified temperature operating range. The cooling fan 206 operates whenever the system is plugged into 120 VAC, whether the power transformer 200 is powered or not. A low power PCBA transforms the 120 VAC supply to 12.6 VDC for use on the timer control. The low power PCBA has a circuit breaker to protect the transformer from over-current conditions.

The timer control PCBA controls the cycle time power provided to the power transformer 200. The LED's 212 mounted on the PCBA indicate which cycle times are selected, what percentage of the cycle that power is supplied to the power transformer 200, when the system is powered, when the system is paused, and when the system is reset. Two push buttons 187 and 188 located on the power supply 124 allow operation of the system to be paused or reset by the operator at the power supply 124.

While the invention has been described with regards to the preferred embodiment and a number of alternative embodiments, it is recognized that other embodiments of the present invention may be devised which would not depart from the scope of the present invention.

What is claimed is:

1. An insect exterminating device using microwaves for exterminating insects located in a structure, comprising:
    a low power microwave emitting assembly comprising means for generating microwaves, said microwave emitting assembly capable of being hand-lifted and positioned within a structure;
    a horn-shaped wave guide coupled to said microwave generating means, said horn-shaped wave guide directing said microwaves to a desired target area to exterminate insects with said microwaves and directing said microwaves away from the user of said exterminating device;
    a power supply for supplying electrical power to said microwave generating means;
    electronic coupling means for coupling said power supply to said microwave generating means; and
    control means for controlling said microwave generating means.

2. The insect exterminating device of claim 1 in which said microwave generating means is a low power magnetron assembly.

3. The insect exterminating device of claim 1 in which said controlling means comprises a remote control means for activating said microwave emitting assembly.

4. The insect exterminating device of claim 1 including an overheating protection circuit operably coupling said microwave generating means to said power supply including a temperature sensor.

5. The insect exterminating device of claim 1 including a digital timer circuit operatively coupled between said microwave generating means and said power supply and including an operational starting circuit with a start button.

6. The insect exterminating device of claim 5 in which said power supply further includes a power transformer control coupling a high voltage power transformer to said digital timer assembly.

7. The insect exterminating device of claim 6 including an output of said power transformer coupled to said microwave generating means via a high voltage line.

* * * * *